(12) United States Patent
Brodie

(10) Patent No.: US 7,746,274 B2
(45) Date of Patent: Jun. 29, 2010

(54) GLOBAL POSITIONING RECEIVER WITH PN CODE OUTPUT

(75) Inventor: Keith J. Brodie, Irvine, CA (US)

(73) Assignee: Atheros Communications, Inc., Santa Clara, CA (US)

( * ) Notice: Subject to any disclaimer, the term of this patent is extended or adjusted under 35 U.S.C. 154(b) by 287 days.

(21) Appl. No.: 11/765,948

(22) Filed: Jun. 20, 2007

(65) Prior Publication Data

US 2007/0296629 A1 Dec. 27, 2007

Related U.S. Application Data

(60) Provisional application No. 60/814,997, filed on Jun. 20, 2006.

(51) Int. Cl.
*G01S 1/02* (2010.01)
*G01C 21/00* (2006.01)

(52) U.S. Cl. .................. 342/357.12; 342/357.06; 701/215

(58) Field of Classification Search .......... 342/357.06, 342/357.12, 357.13, 357.15; 701/213, 215
See application file for complete search history.

(56) References Cited

U.S. PATENT DOCUMENTS

| | | | |
|---|---|---|---|
| 6,330,274 B1 * | 12/2001 | Uehara | 375/150 |
| 2002/0084933 A1 * | 7/2002 | Krasner | 342/357.01 |
| 2005/0123080 A1 * | 6/2005 | Narayan et al. | 375/346 |
| 2005/0281318 A1 * | 12/2005 | Neugebauer | 375/134 |

* cited by examiner

*Primary Examiner*—Dao L Phan
(74) *Attorney, Agent, or Firm*—Bay Area Technology Law Group PC

(57) ABSTRACT

A local ranging system for use with GPS receivers and GPS enabled devices. A device in accordance with the present invention comprises a Radio Frequency (RF) section, the RF section adaptable to receive at least one GPS signal from at least one GPS satellite, and a baseband section, coupled to the RF section, wherein the baseband section performs calculations to determine a geoposition of the GPS receiver based on the at least one GPS signal, wherein the baseband section further comprises a Pseudo Noise (PN) output.

13 Claims, 5 Drawing Sheets

GLOBAL POSITIONING RECEIVER WITH PN CODE OUTPUT

CROSS-REFERENCE TO RELATED APPLICATIONS

This application claims the benefit under 35 U.S.C Section 119(e) of U.S. Provisional Application Ser. No. 60/814,997, filed on Jun. 20, 2006, by Keith J. Brodie, entitled "GLOBAL POSITIONING RECEIVER WITH PN CODE OUTPUT," which application is incorporated by reference herein.

BACKGROUND OF THE INVENTION

1. Field of the Invention

The present invention relates generally to Global Positioning System (GPS) receivers, and in particular, to a GPS receiver with a Pseudo Noise (PN) code output.

2. Description of the Related Art

The use of GPS in consumer products has become commonplace. Hand-held devices used for mountaineering, automobile navigation systems, and GPS for use with cellular telephones are just a few examples of consumer products using GPS technology.

GPS-enabled devices, such as cellular telephones, have also been introduced into the consumer marketplace. These devices allow for the use of Location-Based Services (LBS) which are services, advertisements, and other features that are offered based on the location of the user. As such, GPS-enabled devices are used worldwide.

One of the problems with GPS-enabled devices when used for LBS, or for Emergency 911 (E911) calls is that GPS signals do not have the signal strength necessary to be usefully received when the GPS satellites are not visible in a line-of-sight fashion. So, for example, when a GPS-enabled cellular telephone is inside of a building, parking structure, etc., the GPS positioning functions of that cellular telephone are limited if not completely disabled.

Much of the focus for LBS and E911 has been to determine how best to get cellular telephones to be able to determine position when GPS satellites are not in direct view. Aiding of the GPS signal through the cellular system has provided some help, but most cellular telephones need more than just a time base to determine their position; the addition of a guaranteed time only removes one variable from the equations that must be solved by the GPS receiver.

It can be seen, then, that there is a need in the art to make GPS-enabled devices operable in environments where GPS satellites are not directly visible.

SUMMARY OF THE INVENTION

To minimize the limitations in the prior art, and to minimize other limitations that will become apparent upon reading and understanding the present specification, the present invention describes a local ranging system for use with GPS receivers and GPS enabled devices. A device in accordance with the present invention comprises a Radio Frequency (RF) section, the RF section adaptable to receive at least one GPS signal from at least one GPS satellite, and a baseband section, coupled to the RF section, wherein the baseband section performs calculations to determine a geoposition of the GPS receiver based on the at least one GPS signal, wherein the baseband section further comprises a Pseudo Noise (PN) output.

Such a device further optionally includes the PN output being combined with additional data to create a ranging signal, the ranging signal being transmitted by the GPS receiver, the GPS receiver receiving both the at least one GPS signal and the ranging signal, the GPS receiver receiving both the at least one GPS signal and the ranging signal simultaneously, transmission of the ranging signal being selectively activated based on a request by a second GPS receiver, and the ranging signal being selectively activated based on a number of GPS signals received by the GPS receiver.

A system in accordance with the present invention comprises a plurality of GPS receivers, at least one GPS receiver in the plurality of GPS receivers comprising a Radio Frequency (RF) section, the RF section adaptable to receive at least one GPS signal from at least one GPS satellite, and a baseband section, coupled to the RF section, wherein the baseband section performs calculations to determine a geoposition of the GPS receiver based on the at least one GPS signal, wherein the baseband section further comprises a Pseudo Noise (PN) output.

Such a system further optionally comprises the PN output being combined with additional data to create a ranging signal, a first GPS receiver of the plurality of GPS receivers determining a geoposition of the first GPS receiver, and a second GPS receiver in the plurality of GPS receivers uses at least the geoposition of the first GPS receiver to determine a geoposition of the second GPS receiver, the second GPS receiver determining the geoposition of the second GPS receiver without receiving signals from a GPS satellite, the second GPS receiver receiving both the at least one GPS signal and the ranging signal, the second GPS receiver receiving both the at least one GPS signal and the ranging signal simultaneously, and transmission of the ranging signal being selectively activated based on a request by the second GPS receiver.

A method for determining a position of a receiver using Global Positioning System (GPS) signals in accordance with the present invention comprises determining the position of at least a first GPS receiver using GPS signals, transmitting a Pseudo Noise (PN) output from the first GPS receiver, determining a range of at least a second GPS receiver to the first GPS receiver using the PN output, and determining a position of at least the second GPS receiver using at least the position and the range.

Such a method further optionally comprises determining the position of the second GPS receiver using additional data provided to the second GPS receiver, selectively transmitting the PN output based on a command generated by the second GPS receiver, the PN output being combined with an additional signal to create a ranging signal, the first GPS receiver receiving both the at least one GPS signal and the ranging signal, and the first GPS receiver receiving both the at least one GPS signal and the ranging signal simultaneously.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Figure 1:
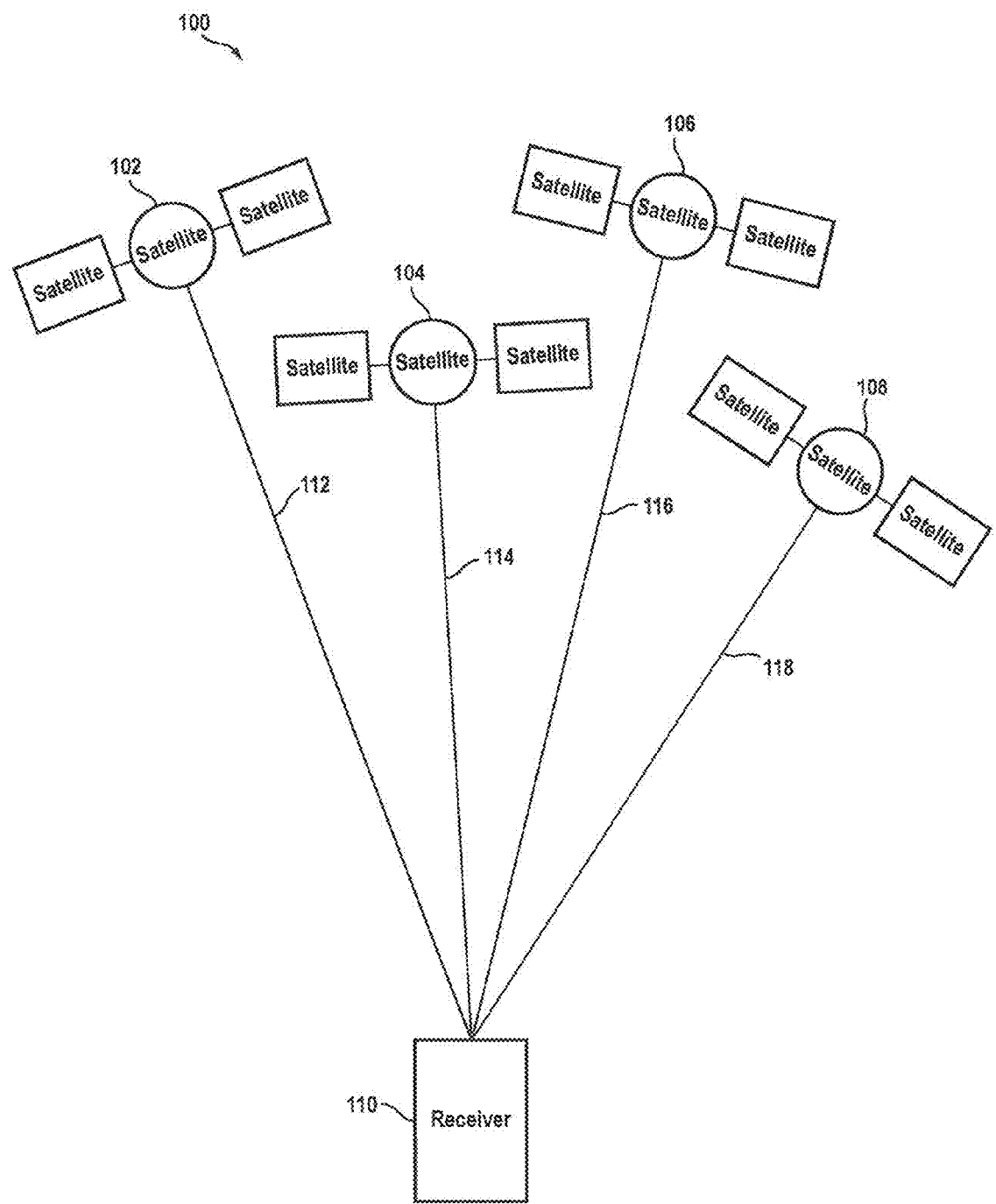
FIG. 1 illustrates a typical Satellite Positioning System in accordance with the present invention.

FIG. 1 illustrates a typical Satellite Positioning System in accordance with the present invention.

System 100 illustrates a constellation of satellites 102-108 and a receiver 110. Each of the satellites 102-108 transmits a signal 112-118 respectively, which signals 112-118 are received by receiver 110.

Signals 112-118 contain information such as time of transmission and system time for system 100. Receiver 110 uses the time it takes for signals 112-118 to travel the distances between the satellites 102-108 and receiver 110 and the data within signals 112-118 to determine the x, y, and z coordinates (geoposition) of receiver 110. This generic ranging system is typically known as the Global Positioning System (GPS), which is described in the related art.

The frequencies of interest in a GPS system 100 are in the "L-band" of frequencies, typically around 1575 MHz, but other positioning systems with other frequencies of interest can also benefit from the present invention.

Local Ranging System

The GPS system determines position by calculating the distance, or range, from the receiver to several satellites, and then solving simultaneous equations such that all of the range determinations are true at a given time. This triangulation gives a single solution, and position is determined thereby. However, when the receiver 110 cannot see enough satellites, no position can be determined for that receiver 110.

The present invention allows for other receivers 110 to assist the receiver 110 by creating a local ranging network, also called a mesh network, in that the range to the receiver 110 that cannot see enough satellites only needs to determine position in relation to other receivers 110 that can determine their own position.

Figure 2:
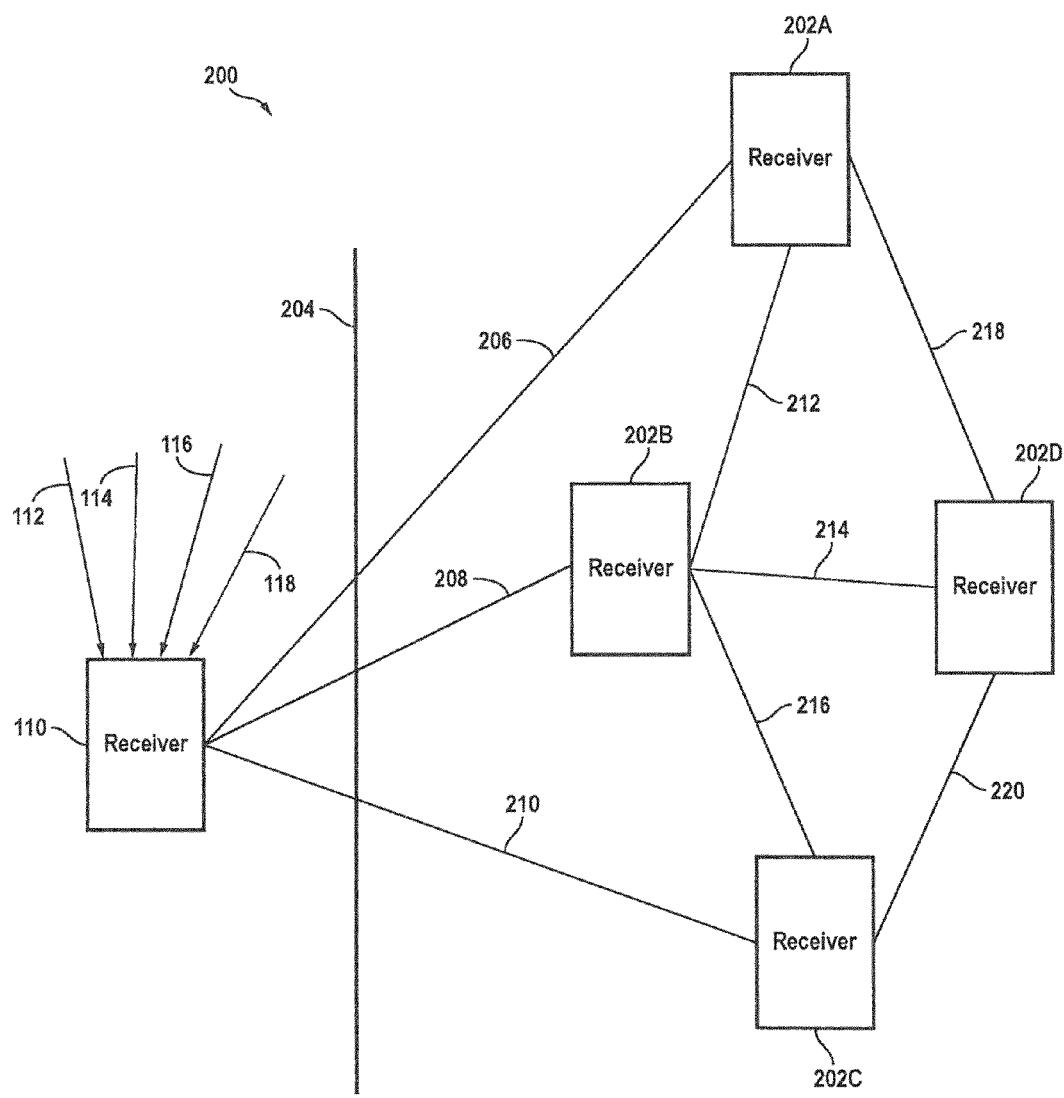
FIG. 2 illustrates a local ranging system in accordance with the present invention.

FIG. 2 illustrates a local ranging system in accordance with the present invention.

System 200 shows receiver 110 receiving GPS signals 112-118, and receivers 202A-202D which have the capability to receive GPS signals 112-118, but cannot receive the GPS signals 112-118 because receivers 202A-202D are not in the line of sight of any enough GPS satellites 102-108 to obtain a position fix. Such situations occur for receivers 202A-202D when, for example, receivers 202A-202D are inside of a building 204, in an urban canyon, etc. and enough of the GPS satellite 102-108 constellation is not in view.

The present invention allows receivers 202A-202D to use a local ranging network, illustrated by signals 206-220, such that each of the receivers 202A-202D can determine their own positions based on the position of receiver 110 and each of the receivers 202A-202D ranges from receiver 110 and the ranges to the other receivers 202A-202D in the system 200.

Additional information can also be provided to receivers 202A-202FD, such as a time determination, such that a position can be determined for receiver 202A-202D with fewer receivers 202A-202D in system 200.

Transmission of Ranging Information

Figure 3:
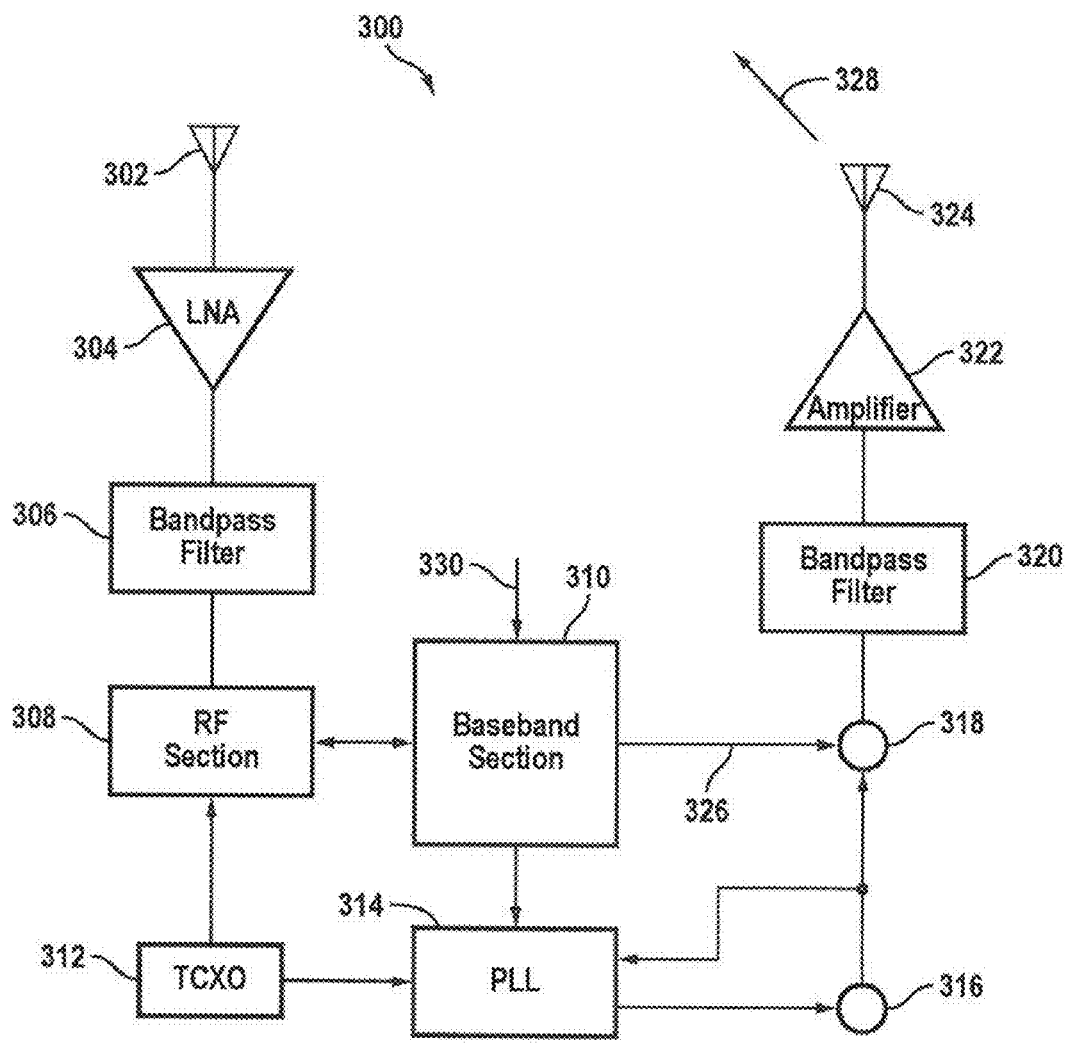
FIG. 3 illustrates a block diagram of the transmission portion of the present invention.

FIG. 3 illustrates a block diagram of the transmission portion of the present invention.

System 300 comprises a GPS receive antenna 302, a Low Noise Amplifier (LNA) 304, a bandpass filter 306, a Radio Frequency (RF) section 308, a baseband section 310, a Temperature Controlled Crystal Oscillator (TOXO) 312, a programmable Phase Locked Loop (PLL) 314, a Voltage Controlled Oscillator (VCO) 316, a Mixer 318, a bandpass filter 320, an amplifier 322, and an antenna 324

GPS signals 112-118 are received by receiver 110 at antenna 302, and amplified if necessary by amplifier 304 These signals are then sent through a bandpass filter 306 and downconverted by RF section 308

Baseband section 310 uses filters and correlators to find and decode the GPS signals 112-118 at a lower frequency, typically 300 MHz Once the GPS signals 112-118 are found, one of the correlators (or matched filters) within the baseband section 310 outputs a signal 326 which is the Pseudo-Noise (PN) output of one of the correlators, which is the satellite signal received from one of the GPS satellites 102-108.

RF section 308 and Baseband section 310 are typically located on separate integrated circuit chips, however, they can be located on a single chip if desired The block diagram of FIG. 3 is merely to illustrate that the functions performed by the RF section 308 and baseband section 310 are separate, not that the sections 308 and 310 are required to be physically separated.

ICXO 312 provides a uniform clock signal to both RF section 308 and to programmable PLL 314, which also controls the frequency output of VCO 316. Typically, VCO 316 oscillates at 900 MHz, but can oscillate at any frequency without departing from the scope of the present invention.

Mixer 318 then mixes the VCO frequency with the PN output 326, and sends the mixed signal through filter 320 such that only one of the products of VCO 316 and PN output 326 is selected. This signal is optionally amplified by amplifier 322, if present, and then transmitted by antenna 324 as signal 328

The signal 328 transmitted by antenna 324 is in the same frequency range as GPS satellite signals 112-118, and, therefore, other receivers 110, namely, receivers 202A-202D, can receive the signal at antenna 302 and process the signal transmitted by antenna 324 via RF section 308 and baseband section 310 as if it were a GPS signal PN output 326 can be mixed with other data 3.30 prior to mixing at mixer 316, such that signal 328 can contain other information that may be useful to receivers 110 and/or receivers 202A-202D. Further, antenna 302 and antenna 328 can be a single antenna 302 if desired, connected by a diplexer/duplexer or other RF switch mechanism, without department from the scope of the present invention.

Reception of Ranging Information

Figure 4:
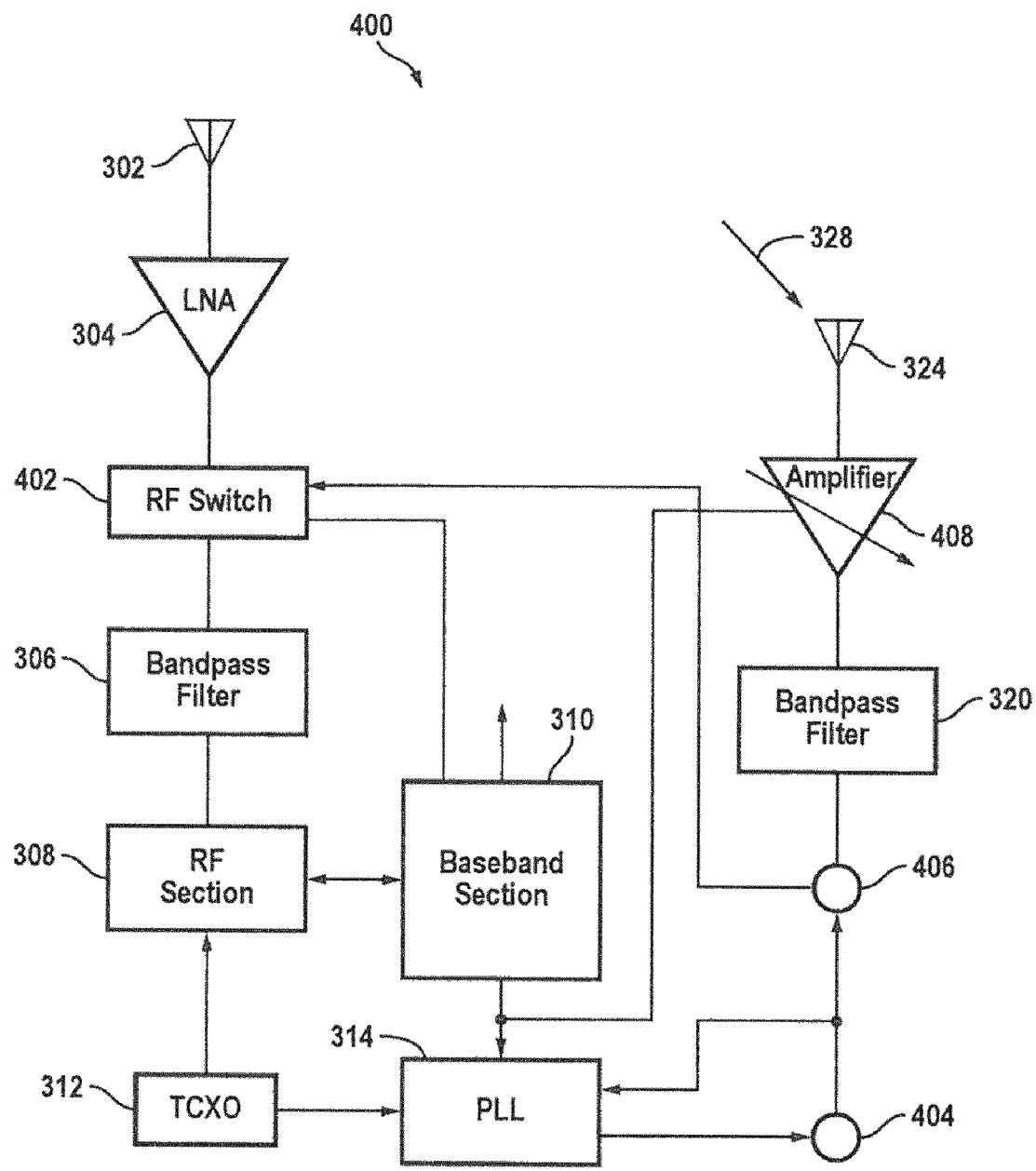
FIG. 4 illustrates a block diagram of the receive portion of the present invention.

FIG. 4 illustrates a block diagram of the receive portion of the present invention.

System 400 is typically also part of a receiver 110 or receiver 202A-202D as with the transmission system 300 described with respect to FIG. 3. System 400 again uses antenna 302 and LNA 304 to receive and amplify GPS signals 112-118. RF switch 402 is introduced into system 400, to allow for the simultaneous and/or sequential reception of GPS signals and signals 328 (from other receivers 202A-202D and 110) respectively.

The received signals (either signals 112-118 or signal 328) is bandpass filtered by filter 306, and processed as described with respect to FIG. 3. However, VCO 404 now controls mixer 406, which receives signals from antenna 324 and amplifier 408, which are mixed and then sent to RF switch 402 for processing rather than the transmission schema described above.

With the extra data that is present in signal 328, a receiver that uses system 300 and system 400 as part of receiver 110 or receivers 202A-202D can now not only determine the geoposition based on GPS signals received directly, but can also determine geoposition based on signals 328 that are received from other receivers 110 or 202A-202D when GPS satellites 102-108 are not visible.

So, for example, and not by way of limitation, in reference to FIG. 2, receiver 110 can determine receiver 110's position based on signals 112-118. However, receivers 202A-202D cannot determine their own position because they cannot receive signals 112-118. However, receiver 202A can receive signals 328, namely, in this case, signals 206, 212, and 218, and therefore can determine position based on the ranges of receiver 202A from receivers 110, 202B, and 202D. Again, for example and not by way of limitation, receiver 202A is able to determine from signal 206 that it is at a certain radius "x" from a known position, namely, the position of receiver 110, because of signal 206. This determination places receiver 202A on a circle, with radius x, and centered at the position of receiver 110. Reductions in which part of that circle may be possible through the use of other aids, e.g., time, other signal inputs, etc.

Further, receiver 202A can also determine that it is at a radius "y" from another position, namely the position of receiver 202B, because of signal 212. Receiver 202A also knows that receiver 202B is at a certain distance "z" from receiver 110 because of signal 208, and therefore, receiver 202A can reduce the possibilities of geoposition of receiver 202A based on this additional information, because both positioning signals must be simultaneously true. Additional information from receiver 202D, and any other receivers 202 that are present in the system 200, can assist receiver 202A in determining receiver 202A's geoposition.

Since this position determination is exactly what a GPS receiver does, the use of the PN signal 328 (which is shown as signals 206-220 in FIG. 2 to delineate between each of the signals 328 being transmitted in system 200) allows for ranging determinations for receivers 202A-202D that are unable to see GPS satellites 102-108 by only adding minimal additional hardware to a standard GPS receiver 110.

Further, receivers 202A-202D can selectively activate the local ranging network 200, and/or systems 300 and 400, if desired. So, for example, and not by way of limitation, if a receiver 202A-202D is receiving signals 112-118, systems 300 and 400 can be deactivated by receivers 202A-202D. However, if another receiver 202A-202D in system 200 requires a position determination and requests assistance, or if receiver 202A-202D 202D loses sight of some or all of signals 112-118, systems 300 and 400 can be activated to allow for local network 200 to be activated.

Such a local network 200 is useful for E911 calls where the receiver 202A-202D is resident in a cellular telephone that can access the telephone network, but cannot perform a position determination. Even if the cellular network provides a time signal and an approximate position based on a cell tower Identification, the receiver 202A-202D must get a few GPS signals 112-118 to perform a position determination. However, with the present invention, other cellular telephones with receivers 202A-202D can be used as positioning aides to assist the receiver 202A-202D in determining position. Such assistance can be done outside of the voice network, typically via control channels or background data channels in cellular networks, without the users of the additional cellular telephones 202A-202F being inconvenienced by sending the signal 328 to other receivers 202A-D in the system 200

Process Chart

Figure 5:
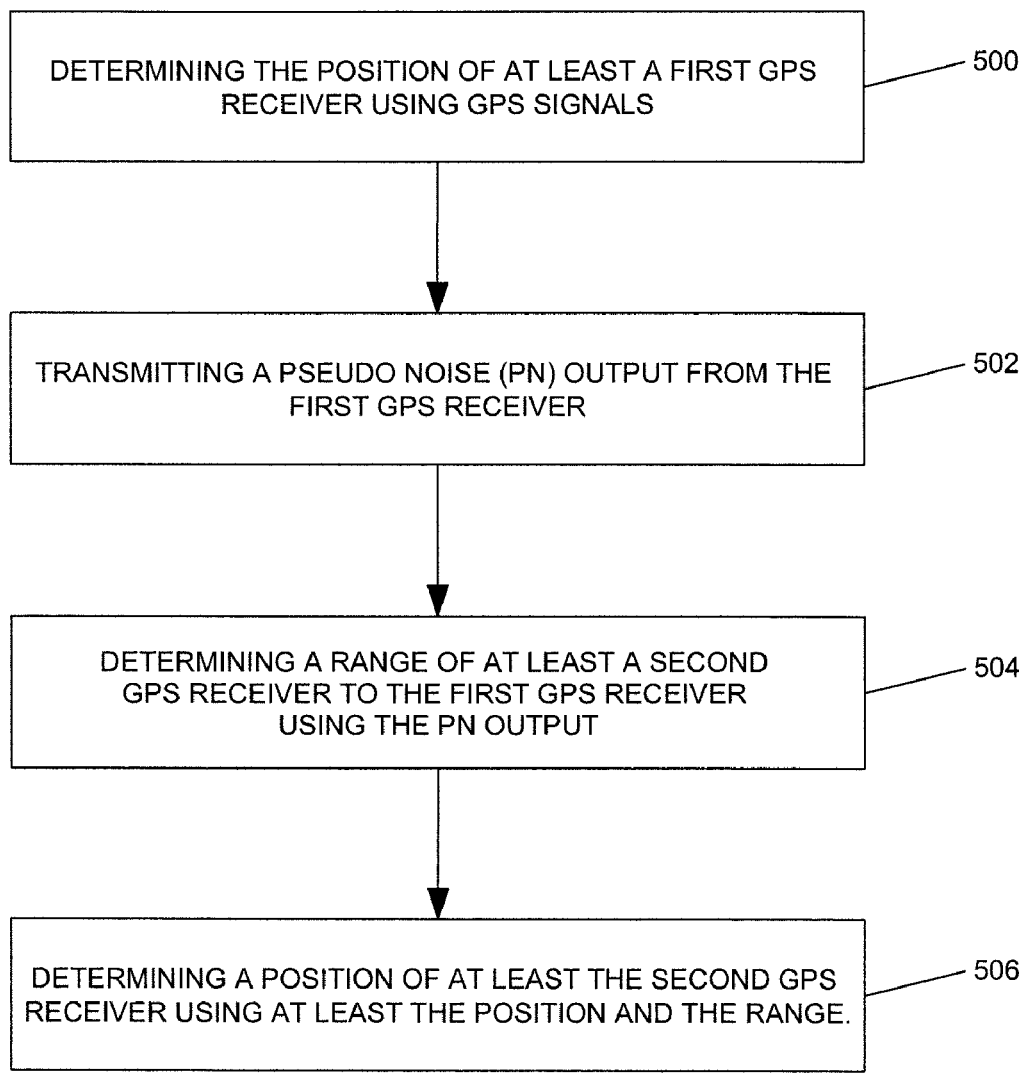
FIG. 5 illustrates a flowchart illustrating the steps used to perform the present invention.

FIG. 5 illustrates a flowchart illustrating the steps used to perform the present invention.

Block 500 illustrates determining the position of at least a first GPS receiver using GPS signals.

Block 502 illustrates transmitting a Pseudo Noise (PN) output from the first GPS receiver.

Block 504 illustrates determining a range of at least a second GPS receiver to the first GPS receiver using the PN output.

Block 506 illustrates determining a position of at least the second GPS receiver using at least the position and the range.

CONCLUSION

In summary, the present invention describes a local ranging system for use with GPS receivers and GPS enabled devices. A device in accordance with the present invention comprises a Radio Frequency (RF) section, the RF section adaptable to receive at least one GPS signal from at least one GPS satellite, and a baseband section, coupled to the RF section, wherein the baseband section performs calculations to determine a geoposition of the GPS receiver based on the at least one GPS signal, wherein the baseband section further comprises a Pseudo Noise (PN) output.

Such a device further optionally includes the PN output being combined with additional data to create a ranging signal, the ranging signal being transmitted by the GPS receiver, the GPS receiver receiving both the at least one GPS signal and the ranging signal, the GPS receiver receiving both the at least one GPS signal and the ranging signal simultaneously, transmission of the ranging signal being selectively activated based on a request by a second GPS receiver, and the ranging signal being selectively activated based on a number of GPS signals received by the GPS receiver.

A system in accordance with the present invention comprises a plurality of GPS receivers, at least one GPS receiver in the plurality of GPS receivers comprising a Radio Frequency (RF) section, the RF section adaptable to receive at least one GPS signal from at least one GPS satellite, and a baseband section, coupled to the RF section, wherein the baseband section performs calculations to determine a geoposition of the GPS receiver based on the at least one GPS signal, wherein the baseband section further comprises a Pseudo Noise (PN) output.

Such a system further optionally comprises the PN output being combined with additional data to create a ranging signal, a first GPS receiver of the plurality of GPS receivers determining a geoposition of the first GPS receiver, and a second GPS receiver in the plurality of GPS receivers uses at least the geoposition of the first GPS receiver to determine a geoposition of the second GPS receiver, the second GPS receiver determining the geoposition of the second GPS receiver without receiving signals from a GPS satellite, the second GPS receiver receiving both the at least one GPS signal and the ranging signal, the second GPS receiver receiving both the at least one GPS signal and the ranging signal simultaneously, and transmission of the ranging signal being selectively activated based on a request by the second GPS receiver.

A method for determining a position of a receiver using Global Positioning System (GPS) signals in accordance with the present invention comprises determining the position of at least a first GPS receiver using GPS signals, transmitting a Pseudo Noise (PN) output from the first GPS receiver, determining a range of at least a second GPS receiver to the first GPS receiver using the PN output, and determining a position of at least the second GPS receiver using at least the position and the range.

Such a method further optionally comprises determining the position of the second GPS receiver using additional data provided to the second GPS receiver, selectively transmitting the PN output based on a command generated by the second GPS receiver, the PN output being combined with an additional signal to create a ranging signal, the first GPS receiver receiving both the at least one GPS signal and the ranging signal, and the first GPS receiver receiving both the at least one GPS signal and the ranging signal simultaneously.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but by the claims and the equivalents of the claims which form a part of this application.

What is claimed is:

1. A Global Positioning System (GPS), comprising:
   a first GPS receiver having
      a Radio Frequency (RF) section, the RF section adaptable to receive at least one GPS signal from at least one GPS satellite; and
      a baseband section, coupled to the RF section, wherein the baseband section performs calculations to determine a geoposition of the GPS receiver based on the at least one GPS signal, wherein the baseband section further comprises a Pseudo Noise (PN) output, wherein the PN output is combined with additional data to create a ranging signal and the ranging signal is transmitted by the GPS receiver;
   a plurality of additional GPS receivers to the first GPS receiver;
   wherein transmission of the ranging signal is selectively activated based upon a request from at least one of the additional GPS receivers; and
   wherein the first GPS receiver determines a geoposition of the first GPS receiver, and at least one of the plurality GPS receivers receives the geoposition of the first GPS receiver to determine a geoposition of the at least one of the plurality of GPS receivers.

2. The GPS receiver of claim 1, wherein the ranging signal is selectively activated based on a number of GPS signals received by the GPS receiver.

3. A local ranging system based on the Global Positioning System (GPS), comprising:
   a plurality of GPS receivers, at least one GPS receiver in the plurality of GPS receivers comprising:
      a Radio Frequency (RF) section, the RF section adaptable to receive at least one GPS signal from at least one GPS satellite; and
      a baseband section, coupled to the RF section, wherein the baseband section performs calculations to determine a geoposition of the GPS receiver based on the at least one GPS signal, wherein the baseband section further comprises a Pseudo Noise (PN) output and wherein the PN output is combined with additional data to create a ranging signal; and
   wherein a first GPS receiver of the plurality of GPS receivers determines a geoposition of the first GPS receiver, and a second GPS receiver in the plurality of GPS receivers uses at least the geoposition of the first GPS receiver to determine a geoposition of the second GPS receiver.

4. The local ranging system of claim 3, wherein the second GPS receiver determines the geoposition of the second GPS receiver without receiving signals from a GPS satellite.

5. The local ranging system of claim 3, wherein the second GPS receiver receives both the at least one GPS signal and the ranging signal.

6. The GPS receiver of claim 3, wherein the second GPS receiver receives both the at least one GPS signal and the ranging signal simultaneously.

7. The GPS receiver of claim 3, wherein transmission of the ranging signal is selectively activated based on a request by the second GPS receiver.

8. A method for determining a position of a receiver using Global Positioning System (GPS) signals, comprising:
   determining the position of at least a first GPS receiver using GPS signals;
   transmitting a Pseudo Noise (PN) output from the first GPS receiver;
   determining a range of at least a second GPS receiver to the first GPS receiver using the PN output; and
   determining a position of at least the second GPS receiver using at least the position and the range.

9. The method of claim 8, wherein the step of determining a position of at least the second GPS receiver further comprises determining the position of the second GPS receiver using additional data provided to the second GPS receiver.

10. The method of claim 9, further comprising selectively transmitting the PN output based on a command generated by the second GPS receiver.

11. The method of claim 9, wherein the PN output is combined with an additional signal to create a ranging signal.

12. The method of claim 11, wherein the first GPS receiver receives both the at least one GPS signal and the ranging signal.

13. The method of claim 11, wherein the first GPS receiver receives both the at least one GPS signal and the ranging signal simultaneously.

* * * * *